US010836541B2

(12) United States Patent
Proudfoot et al.

(10) Patent No.: US 10,836,541 B2
(45) Date of Patent: Nov. 17, 2020

(54) VALVE FOR A DISPENSING CONTAINER

(71) Applicant: Gateway Plastics, Inc., Mequon, WI (US)

(72) Inventors: Robert E. Proudfoot, West Bend, WI (US); Terrence M. Parve, Menomonee Falls, WI (US)

(73) Assignee: Gateway Plastics, Inc., Mequon, WI (US)

( * ) Notice: Subject to any disclaimer, the term of this patent is extended or adjusted under 35 U.S.C. 154(b) by 0 days.

(21) Appl. No.: 15/823,071

(22) Filed: Nov. 27, 2017

(65) Prior Publication Data

US 2019/0161245 A1     May 30, 2019

(51) Int. Cl.
| | |
|---|---|
| *B65D 35/52* | (2006.01) |
| *B65D 35/46* | (2006.01) |
| *B65D 47/08* | (2006.01) |
| *F16K 15/14* | (2006.01) |
| *B65D 47/20* | (2006.01) |
| *B65D 47/24* | (2006.01) |
| *B65D 79/00* | (2006.01) |

(52) U.S. Cl.
CPC ......... *B65D 35/46* (2013.01); *B65D 47/0809* (2013.01); *B65D 47/2031* (2013.01); *B65D 47/246* (2013.01); *F16K 15/147* (2013.01); *B65D 79/005* (2013.01)

(58) Field of Classification Search
CPC .............. B65D 47/205; B65D 47/0809; B65D 47/246; B65D 47/2031; B65D 35/46; B65D 35/38; B65D 35/04; B65D 35/08; B65D 79/005; F16K 15/147

USPC ......................... 222/490, 494, 546, 212, 213
See application file for complete search history.

(56) References Cited

U.S. PATENT DOCUMENTS

| | | |
|---|---|---|
| 3,941,149 A | 3/1976 | Mittleman |
| 4,728,006 A | 3/1988 | Drobish et al. |
| 4,749,108 A † | 6/1988 | Dornbusch |
| 4,991,745 A | 2/1991 | Brown |
| 5,033,655 A | 7/1991 | Brown |
| 5,071,017 A | 12/1991 | Stull |

(Continued)

FOREIGN PATENT DOCUMENTS

| | | |
|---|---|---|
| CA | 2768118 | 8/2014 |
| EP | 2 016 003 | 3/2010 |

(Continued)

*Primary Examiner* — Charles Cheyney
(74) *Attorney, Agent, or Firm* — Foley & Lardner LLP

(57) ABSTRACT

A valve assembly for a dispensing container includes a closure body detachably coupled to a co-injected valve. The closure body includes a main closure body coupled to a closure cap via a flexible hinge. The co-injected valve includes a valve head and a valve frame. The valve head includes a valve head portion with multiple valve head slits, a sleeve portion, and a peripheral sealing flange. The valve frame is permanently coupled to the valve head and includes a radial ledge and a radial wall that support the peripheral sealing flange of the valve head. The co-injected valve is fabricated via a two-step injection molding process. The first step includes fabricating the valve frame from a first injection material, and the second step includes fabricating the valve member from a second injection material.

8 Claims, 9 Drawing Sheets

SECTION C-C

(56) References Cited

U.S. PATENT DOCUMENTS

| | | | |
|---|---|---|---|
| 5,115,950 A | 5/1992 | Rohr | |
| 5,213,236 A | 5/1993 | Brown et al. | |
| 5,271,531 A | 12/1993 | Rohr et al. | |
| 5,339,995 A | 8/1994 | Brown et al. | |
| 5,377,877 A | 1/1995 | Brown et al. | |
| 5,409,144 A | 4/1995 | Brown | |
| 5,439,143 A | 8/1995 | Brown et al. | |
| 5,531,363 A * | 7/1996 | Gross | B65D 47/2031 222/494 |
| 5,743,443 A * | 4/1998 | Hins | B29C 45/1635 222/490 |
| 5,839,614 A | 11/1998 | Brown | |
| 5,839,626 A | 11/1998 | Gross et al. | |
| 5,842,618 A * | 12/1998 | Julemont | B65D 47/2031 222/490 |
| 5,897,033 A * | 4/1999 | Okawa | B65D 47/2031 222/212 |
| 5,904,275 A | 5/1999 | Suffa | |
| 5,927,566 A | 7/1999 | Mueller | |
| 5,944,234 A * | 8/1999 | Lampe | B65D 47/0804 222/490 |
| 6,089,411 A * | 7/2000 | Baudin | B65D 47/2031 222/212 |
| 6,089,418 A | 7/2000 | Gaiser et al. | |
| 6,095,381 A | 8/2000 | Schwanenberg | |
| 6,131,806 A | 10/2000 | Hess et al. | |
| 6,176,399 B1 | 1/2001 | Schantz et al. | |
| 6,213,355 B1 † | 4/2001 | Schwanenberg | |
| 6,230,940 B1 | 5/2001 | Manning et al. | |
| 6,273,305 B1 † | 8/2001 | Fioravanti | |
| 6,279,783 B1 | 8/2001 | Brown et al. | |
| 6,293,437 B1 | 9/2001 | Socier et al. | |
| 6,321,947 B2 | 11/2001 | Gross et al. | |
| 6,367,668 B1 * | 4/2002 | Schwanenberg | B65D 47/2031 222/490 |
| 6,371,340 B1 † | 4/2002 | Pateman | |
| H2027 H | 6/2002 | Brown et al. | |
| 6,398,077 B1 | 6/2002 | Gross et al. | |
| 6,405,901 B1 | 6/2002 | Schantz et al. | |
| 6,427,874 B2 | 8/2002 | Brown et al. | |
| 6,497,346 B1 * | 12/2002 | Dubois | B05B 11/0072 222/212 |
| 6,530,504 B2 | 3/2003 | Socier | |
| 6,543,652 B1 | 4/2003 | Kelder et al. | |
| 6,616,016 B2 | 9/2003 | Hicks et al. | |
| 6,672,487 B1 * | 1/2004 | Lohrman | B65D 47/0804 222/1 |
| 6,726,063 B2 | 4/2004 | Stull et al. | |
| 6,769,577 B1 | 8/2004 | Feierabend | |
| 6,910,607 B2 * | 6/2005 | Gaiser | B65D 47/2031 222/212 |
| 6,951,295 B1 | 10/2005 | Gaus et al. | |
| 6,971,558 B2 † | 12/2005 | Ramsey | |
| 7,077,296 B2 | 7/2006 | Brown et al. | |
| 7,086,572 B2 | 8/2006 | Socier et al. | |
| 7,152,763 B2 | 12/2006 | Stull et al. | |
| RE39,520 E | 3/2007 | Hess et al. | |
| 7,255,250 B2 * | 8/2007 | Pugne | B65D 47/0804 215/327 |
| 7,299,952 B2 | 11/2007 | Stull et al. | |
| 7,503,469 B2 * | 3/2009 | Bloom | B65D 47/2031 222/212 |
| 7,543,724 B2 | 6/2009 | Brunner et al. | |
| 7,588,714 B1 | 9/2009 | Graham | |
| 7,699,193 B2 * | 4/2010 | Feierabend | F16K 21/04 222/490 |
| 7,784,652 B2 | 8/2010 | Gaus et al. | |
| 7,980,430 B2 | 7/2011 | Hickok et al. | |
| 8,079,385 B2 | 12/2011 | Hatton | |
| 8,397,956 B2 * | 3/2013 | Olechowski | B65D 47/2031 222/494 |
| 8,793,874 B2 | 8/2014 | Gram | |
| 9,580,214 B2 † | 2/2017 | Hatton | |
| 2002/0162839 A1 * | 11/2002 | Stull | B65D 47/0804 220/229 |
| 2003/0106910 A1 * | 6/2003 | Hicks | B65D 47/0847 222/494 |
| 2003/0173379 A1 * | 9/2003 | Gaiser | B65D 47/2031 222/494 |
| 2004/0200738 A1 | 10/2004 | Rovelli et al. | |
| 2006/0201976 A1 * | 9/2006 | Bloom | B65D 47/2031 222/494 |
| 2006/0249545 A1 † | 11/2006 | Ramsey | |
| 2007/0029352 A1 * | 2/2007 | Norris | B65D 47/2031 222/494 |
| 2007/0138214 A1 * | 6/2007 | De'Padova | B29C 45/1676 222/402.13 |
| 2007/0289936 A1 * | 12/2007 | Pugne | B29C 45/1676 215/237 |
| 2009/0050648 A1 * | 2/2009 | Wisniewski | B65D 47/2031 222/83 |
| 2012/0006860 A1 | 1/2012 | Suffa et al. | |
| 2013/0256342 A1 | 10/2013 | Bloom et al. | |
| 2015/0014369 A1 | 1/2015 | Hatton et al. | |
| 2016/0023818 A1 * | 1/2016 | Gelov | B65D 35/04 220/254.1 |
| 2017/0267422 A1 † | 9/2017 | Kieras | |

FOREIGN PATENT DOCUMENTS

| | | |
|---|---|---|
| WO | WO-2006/119315 | 11/2006 |
| WO | WO-2007/145780 A2 | 12/2007 |
| WO | WO-2013/039482 A1 | 3/2013 |
| WO | WO-2013/138087 A2 | 9/2013 |
| WO | WO-2013/175216 | 11/2013 |

\* cited by examiner
† cited by third party

VALVE FOR A DISPENSING CONTAINER

BACKGROUND

The present disclosure relates generally to a co-injected valve assembly utilized for the dispensing of flowable product from a dispensing container. A number of consumer goods are sold in such dispensing containers, including, but not limited to, foodstuffs (e.g., ketchup, mustard, honey), personal care products (e.g., shampoos, liquid soaps, lotions), and other household products (e.g., detergents, automotive oils). Conventional valve assemblies for these dispensing containers often include silicone valve heads, which present several drawbacks. Silicone is unable to be co-injected to a strong frame or holder material in an injection molding process, and it is not recyclable. A valve assembly that is recyclable and able to manufactured via a co-injection molding process would therefore be useful.

The co-injected valve assembly of the present disclosure is configured to open reliably when force is applied to the dispensing container. The co-injected valve assembly is further configured to be self-closing in that it closes in a reliable and sealed fashion in the absence of force applied to the dispensing container. The molding process for the valve assembly generally includes the sequential injection of multiple polymeric materials (e.g., thermoplastic elastomers, polypropylene) into multiple cavities within a single mold to form an inseparable valve assembly including a valve head supported by a valve frame.

SUMMARY

One implementation of the present disclosure is a valve assembly for a dispensing container. The valve assembly includes a closure body detachably coupled to a co-injected valve. The closure body includes a main closure body coupled to a closure cap via a flexible hinge. The co-injected valve includes a valve head and a valve frame. The valve head includes a valve head portion with multiple valve head slits, a sleeve portion, and a peripheral sealing flange. The valve frame is permanently coupled to the valve head and includes a radial ledge and a radial wall that support the peripheral sealing flange of the valve head. The co-injected valve is fabricated via a two-step injection molding process. The first step includes fabricating the valve frame from a first injection material, and the second step includes fabricating the valve member from a second injection material.

In some embodiments, the first injection material is polypropylene. In other embodiments, the second injection material is a thermoplastic elastomer.

In some embodiments, the valve head slits are formed via a mechanical cutting process. In other embodiments, the valve head slits are formed via a laser cutting process.

In some embodiments, the valve frame further includes an access window configured to permit passage of an injection molding nozzle used to deposit the second injection material.

In some embodiments, the closure body is coupled to the co-injected valve via at least one of a snap fit assembly process and an ultrasonic assembly process.

In some embodiments, the closure cap further includes a stopper configured to support the valve head when the closure body is in a closed cap position.

In some embodiments, the closure body further includes threads configured to threadably couple the closure body to the dispensing container.

Another implementation of the present disclosure is a co-injection molded valve. The co-injection molded valve includes a valve head and a valve frame. The valve head includes a valve head portion with valve head slits, a sleeve portion, and a peripheral sealing flange. The valve frame is permanently coupled to the valve head and includes a radial ledge and a radial wall configured to support the peripheral sealing flange of the valve head. The co-injected molded valve is fabricated via a two-step injection molding process. The first step includes fabricating the valve frame from a first injection material, and the second step includes fabricating the valve head from a second injection material.

In some embodiments, the first injection material is polypropylene. In other embodiments, the second injection material is a thermoplastic elastomer.

In some embodiments, the valve head slits are formed via a mechanical cutting process. In other embodiments, the valve head slits are formed via a laser cutting process.

In some embodiments, the radial wall includes a retention notch configured to couple the co-injection molded valve to a dispensing container closure body via at least one of a snap fit assembly process and an ultrasonic assembly process.

Yet another implementation of the present disclosure is a method of manufacturing a co-injection molded valve. The method includes depositing a first injection material from a first injection nozzle into a first mold cavity to form a valve frame. The valve frame includes a radial ledge and a radial wall extending from the radial ledge. The method also includes depositing a second injection material from a second injection nozzle into a second mold cavity to form a valve head. The valve head includes a valve head portion, a sleeve portion, and a peripheral sealing flange.

In some embodiments, the first injection material is polypropylene. In other embodiments, the second injection material is a thermoplastic elastomer.

In some embodiments, the valve frame further includes an access window. The access window is configured to permit passage of the second injection nozzle through the valve frame.

In some embodiments, the method further includes forming valve slits in the valve head portion via at least one of a laser cutting process and a mechanical cutting process.

DETAILED DESCRIPTION

Overview

Referring generally to the FIGURES, a valve assembly for a dispensing container is shown according to various exemplary embodiments. The valve assembly can include a co-injected valve detachably coupled to a closure body. The co-injected valve can be formed by injection molding a plurality of polymeric materials into mold cavities to form a layered valve component. The layered valve component can include a flexible valve head supported by and inseparably coupled to a rigid valve frame. The flexible valve head can be fabricated from a thermoplastic elastomer (TPE), while the rigid valve frame can be fabricated from polypropylene (PP).

Before discussing further details of the valve for the dispensing container and/or the components thereof, it should be noted that references to "front," "back," "rear," "upper," "lower," "inner," "outer," "right," and "left," and other directions in this description are merely used to identify the various elements as they are oriented in the FIGURES. These terms are not meant to limit the element which they describe, as the various elements may be oriented differently in various applications. Additionally, any dimensions or sizes specified for the valve for the dispensing container and/or the components thereof should be interpreted as describing an exemplary embodiment and should not be regarded as limiting. The valve and the dispensing container can have any of a variety of shapes and/or sizes in various applications.

Valve Assembly

Figure 1:
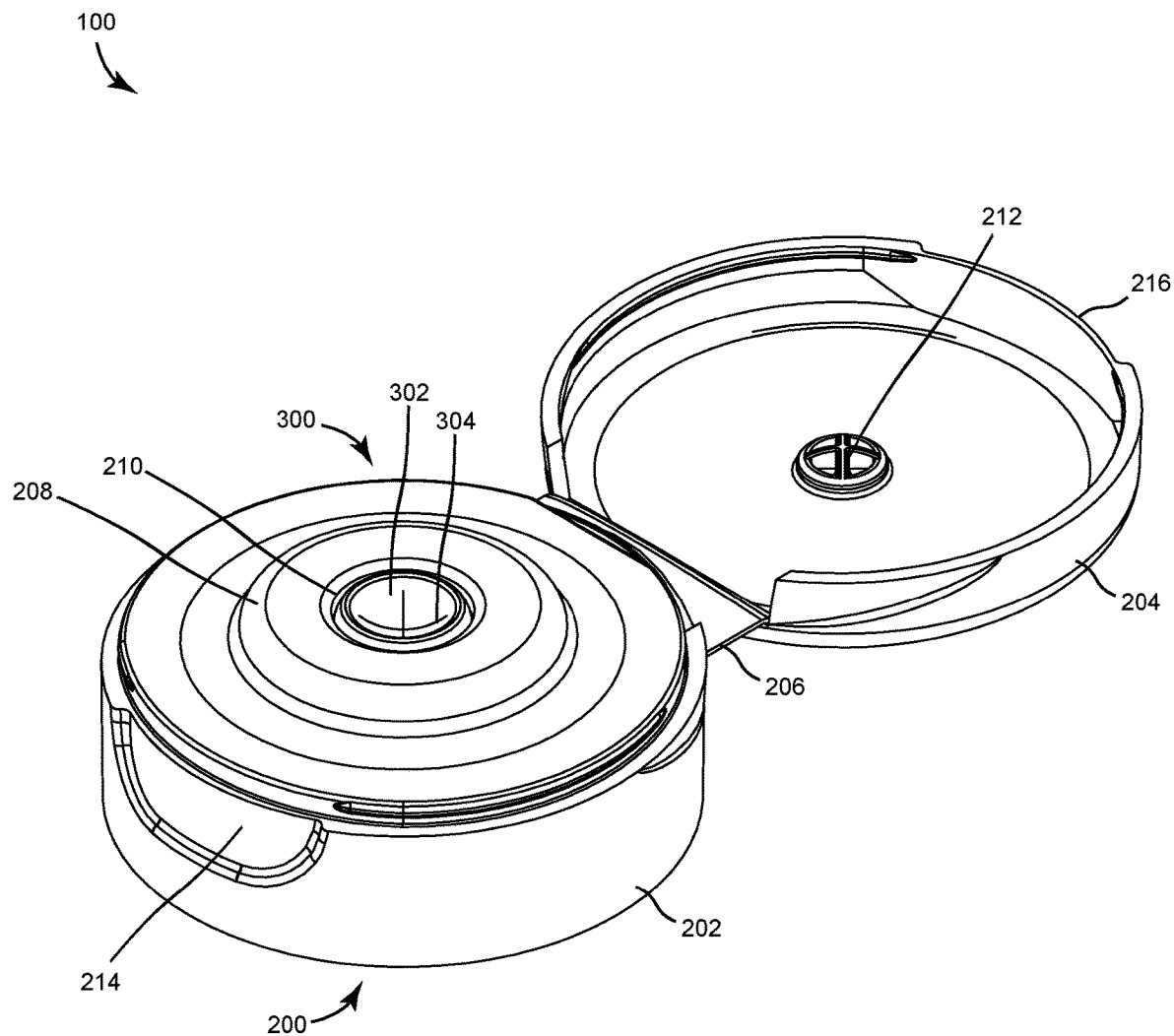
FIG. 1 is a top perspective view of a valve and closure assembly for a dispensing container in a closed position, according to an exemplary embodiment.
Figure 2:
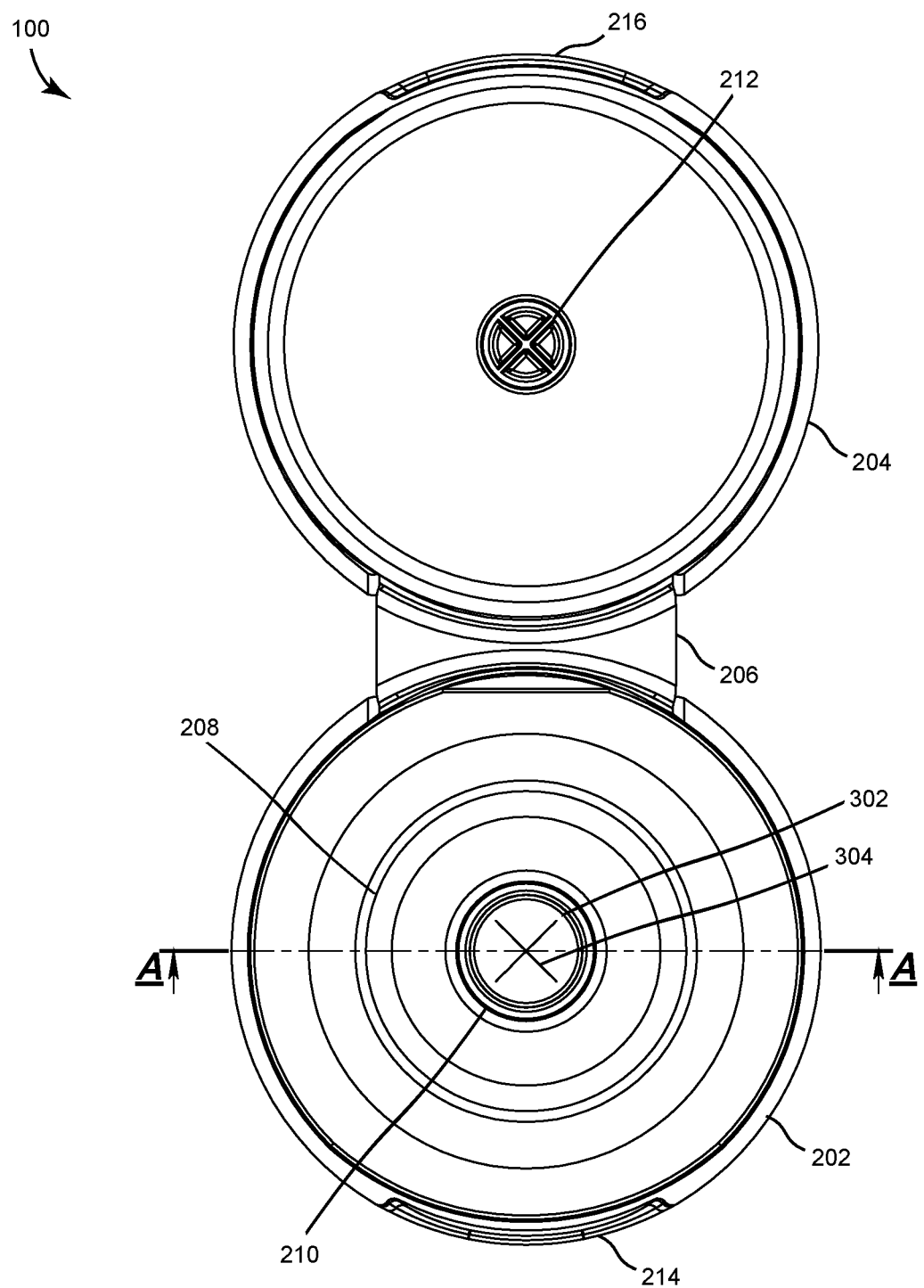
FIG. 2 is a top elevation view of the valve and closure assembly of FIG. 1, according to an exemplary embodiment.
Figure 3:
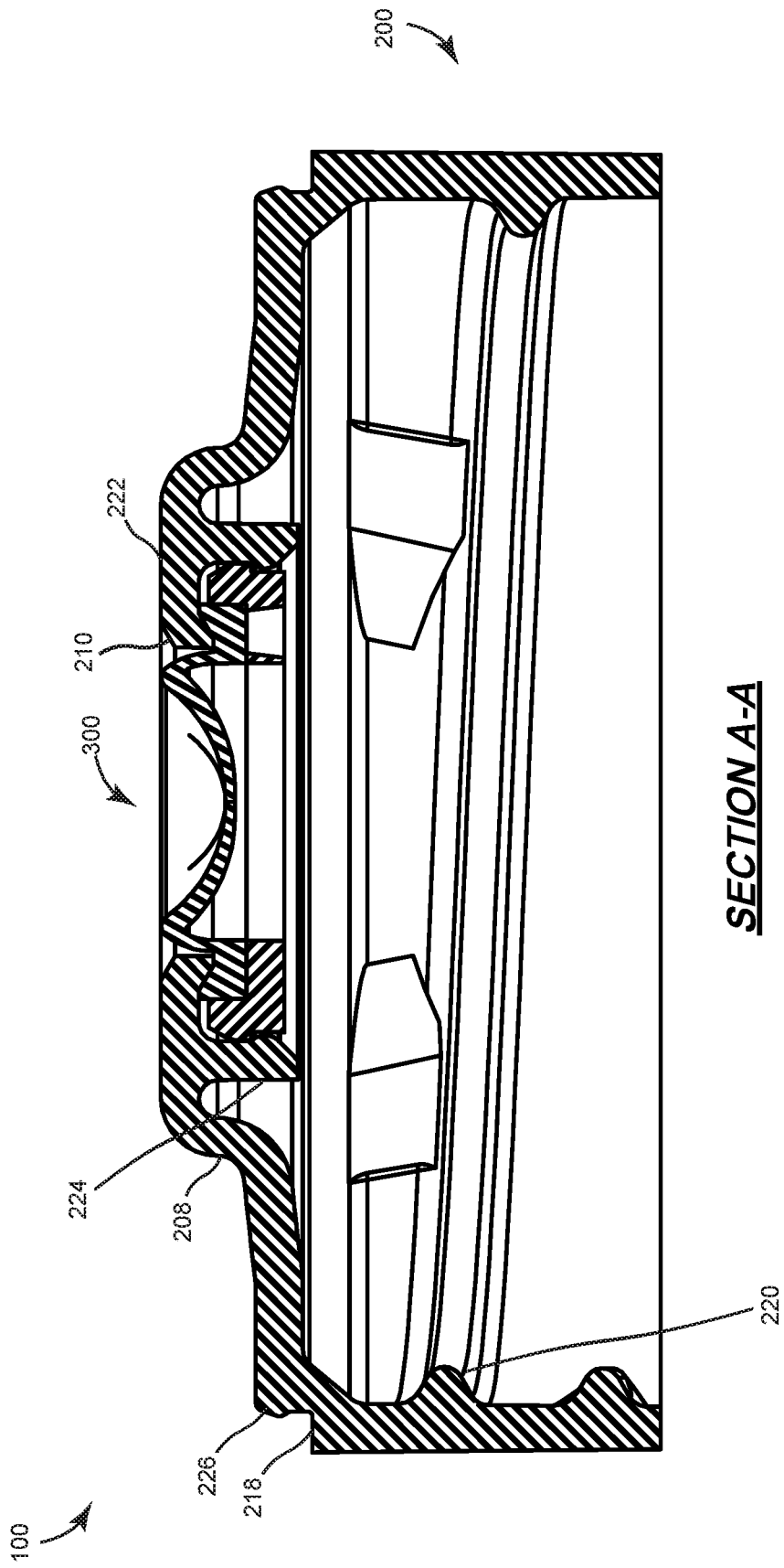
FIG. 3 is a side cross-sectional view of the valve and closure assembly of FIG. 1 taken along the line A-A in FIG. 2, according to an exemplary embodiment.
Figure 9:
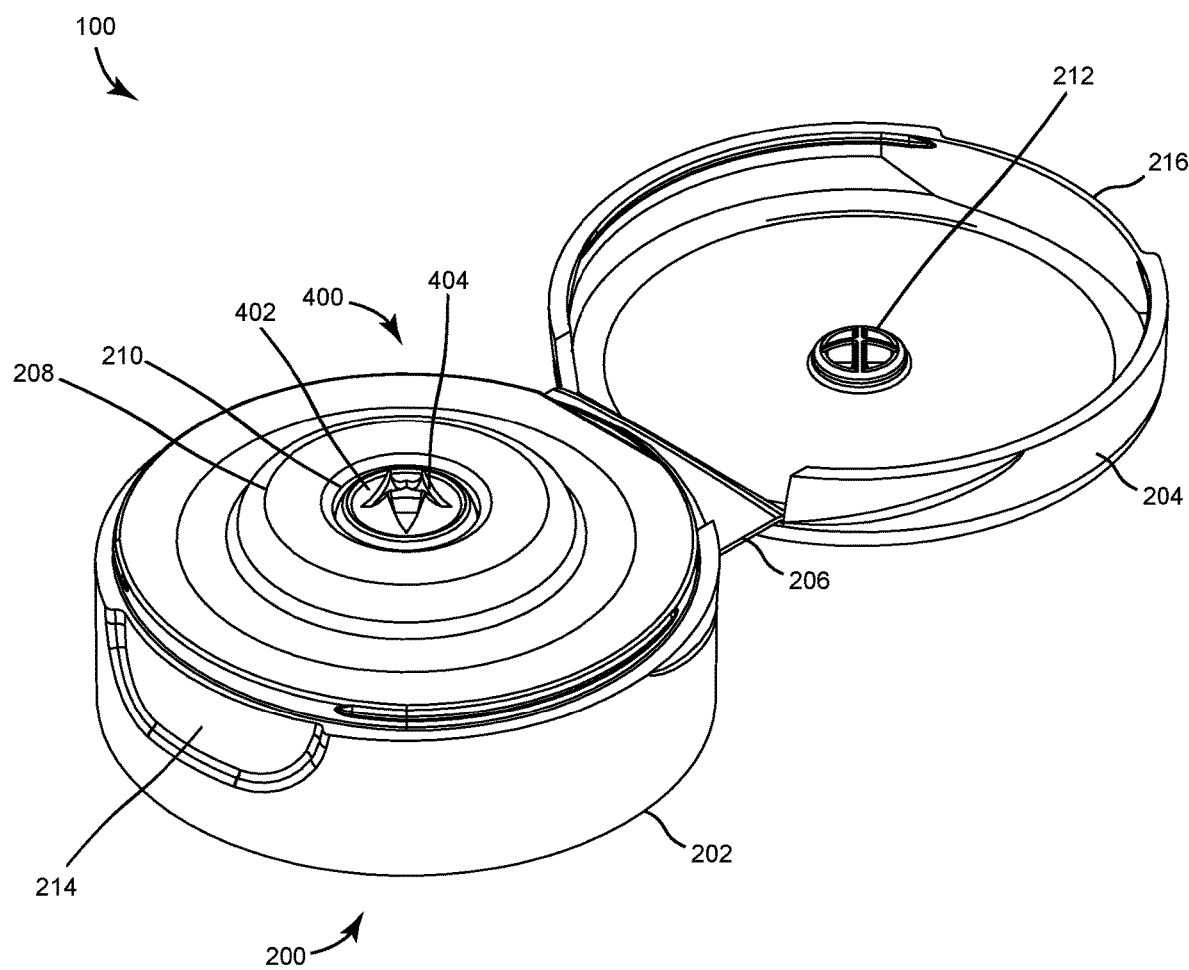
FIG. 9 is a top perspective view of the valve and closure assembly of FIG. 1 in an open position, according to an exemplary embodiment.
Figure 10:
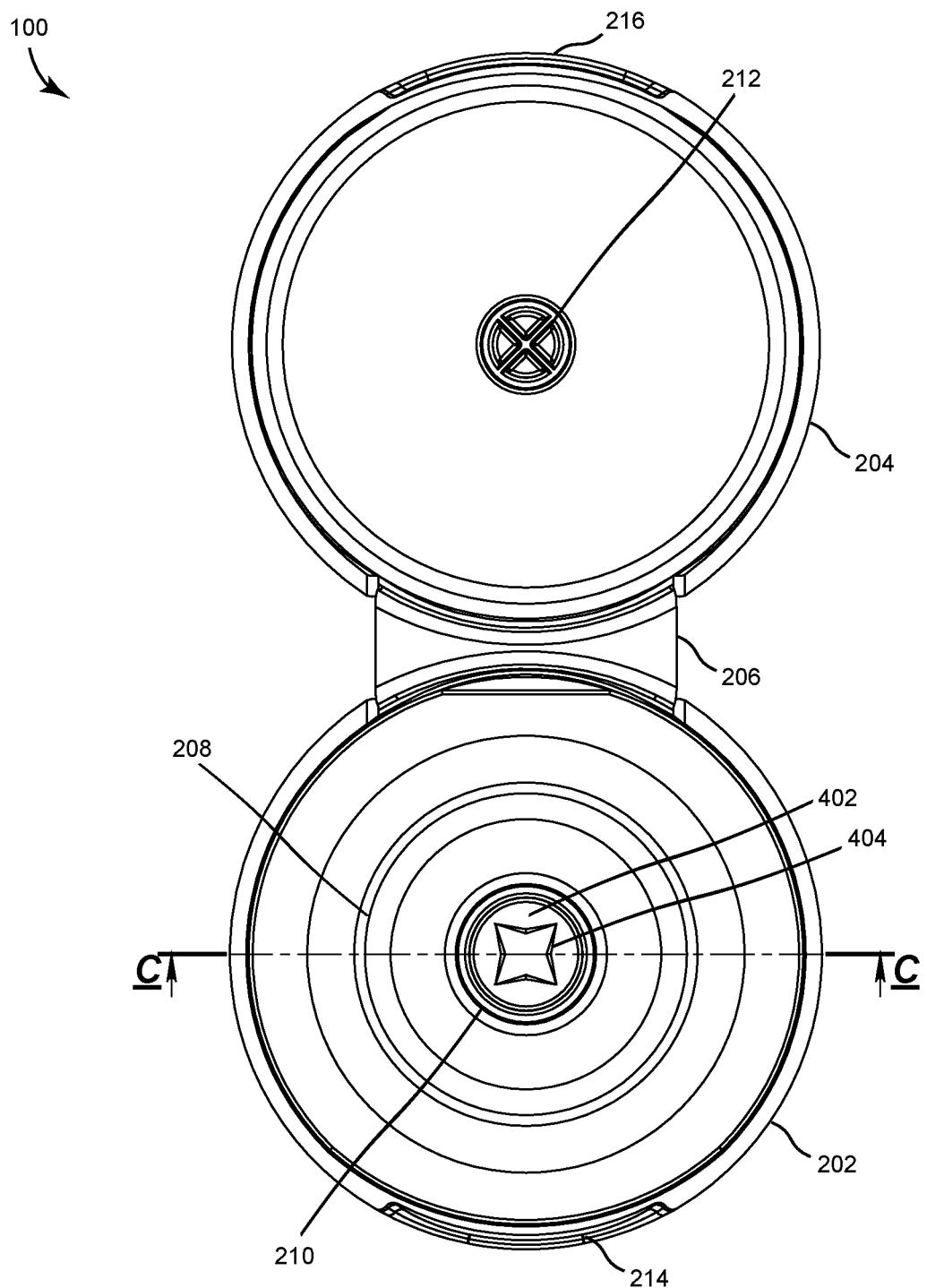
FIG. 10 is a top elevation view of the valve and closure assembly of FIG. 1 in an open position, according to an exemplary embodiment.
Figure 11:
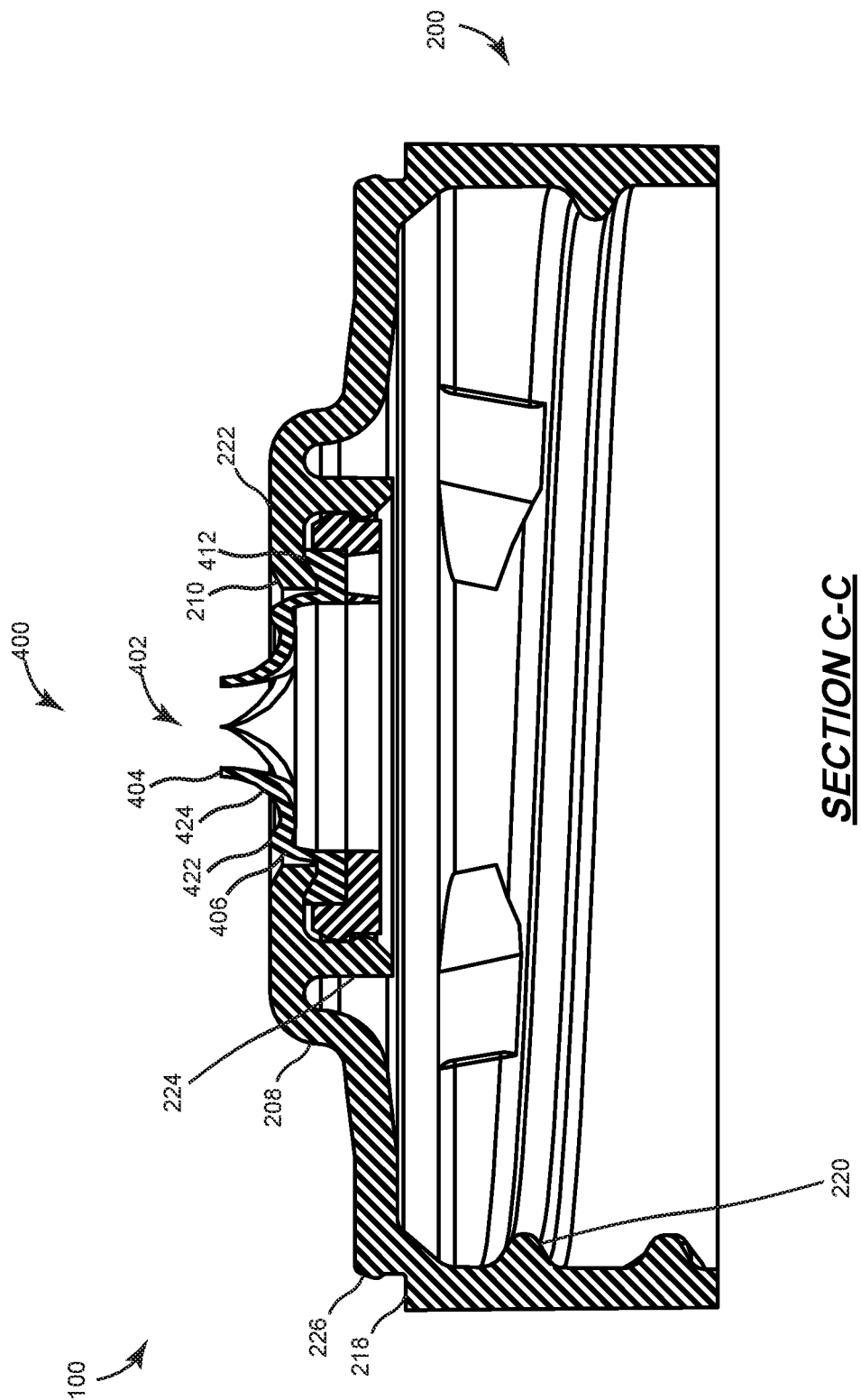
FIG. 11 is a side cross-sectional view of the valve and closure assembly of FIG. 1 in an open position taken along the line C-C in FIG. 7, according to an exemplary embodiment.

Referring now to FIGS. 1-3, a valve assembly 100 for a dispensing container is depicted, according to an exemplary embodiment. FIGS. 1 and 2 respectively depict a perspective view and a top view of the valve assembly 100, while FIG. 3 depicts a sectional view of the valve assembly 100 taken along the line A-A of FIG. 2 is shown. Valve assembly 100 is shown to include a closure body 200 detachably coupled to a co-injected valve 300. The co-injected valve 300 may be configured to travel between a closed valve position, in which the contents of the dispensing container are prevented from flowing out of the dispensing container, and an open valve position, in which the contents are permitted to flow freely out of the dispensing container. Each of the FIGS. 1-3 depict the co-injected valve 300 of valve assembly 100 in the closed valve position. FIGS. 9-11, described in further detail below, depict the co-injected valve 300 in the open valve position.

Closure body 200 includes a main closure body 202 and a closure cap 204. In various embodiments, closure body 200 may be formed via an injection molding process out of any suitable material (e.g., polypropylene (PP), polyethylene (PE)). The main closure body 202 includes a central raised portion 208 and a central aperture 210. The central aperture 210 may be configured to receive the co-injected valve 300 such that the valve head 302 protrudes at least partially past the central raised portion 208 when the co-injected valve 300 is in the open valve position. When the co-injected valve 300 is in the closed valve position, the co-injected valve 300 may be configured to sit substantially below the central raised portion 208.

Valve head 302 of the co-injected valve 300 has a substantially concave shape while in the closed position and when viewed from the exterior of the dispensing container. Valve head 302 may include one or more valve slits 304 configured to form an aperture that permits passage of the contents of the dispensing container when the valve head 302 is in the open valve position. In various embodiments, the one or more valve slits 304 may be formed by a laser or mechanical blade slitting or cutting process after co-injected valve 300 is formed via an injection molding process, as described in further detail below.

As shown, in some embodiments, the valve slits 304 may form an "X" shape (i.e., the slits are located 90 degrees apart from each other) when valve head 302 is in the closed valve position. In other embodiments, the valve slits 304 may form other shapes. The size, number, and shape of the valve slits 304 may be selected based on the contents of the dispensing container to ensure that the contents are permitted to flow freely without requiring the application of excess force to the outside of the dispensing container during a dispensing process, while at the same time preventing leakage from the valve head 302 in the absence of force applied to the dispensing container. For example, if the valve slits 304 are too large, the co-injected valve 300 will not properly return to the closed valve position from the open valve position when applied force is removed from the dispensing container, and the contents of the dispensing container will leak out of the co-injected valve 300.

Returning to the closure body 200, hinge 206 is shown to couple the main closure body 202 to the closure cap 204. In some embodiments, hinge 206 is a living hinge. A living hinge is a formed as an extension of the base and cap material during an injection molding process. In some embodiments, hinge 206 is thin and flexible, allowing the closure cap 204 to rotate 180 degrees or more between a closed cap position and an opened cap position. The opened cap position permits the closure cap 204 to bend out of the way of the main closure body 202 as the contents of the container are dispensed.

Referring specifically to FIGS. 1 and 2, closure cap 204 is shown to include a stopper 212 and a cap opening recess 216. In some embodiments, stopper 212 is a protrusion feature formed during the injection molding process of closure body 200. Stopper 212 may be configured to prevent the valve head 302 from flexing when the dispensing container is inverted. For example, stopper 212 may have a substantially convex shape in order to mate with the substantially concave shape of the valve head 302. By preventing the valve head 302 from flexing, the stopper 212 may prevent pressure from the contents of the dispensing container from acting to move the valve head 302 from the closed valve position to the open valve position, thus preventing drips or other leakage of the contents of the dispensing container into the closure body 200.

The cap opening recess 216 on the closure cap 204 may align with a corresponding cap opening recess 214 on the main closure body 202 when the closure cap 204 is in the closed cap position. Both cap opening recesses 214 and 216 may be located approximately 180 degrees from the hinge 206 when the closure body 200 is in the closed cap position. By locating the cap opening recesses 214 and 216 in this way, a user wishing to move the closure cap 204 from the closed cap position to the open cap position is guided to apply force on the closure cap 204 in the area of the recesses 214 and 216, thus permitting closure cap 204 to be easily rotated upward from the closed cap position to the open cap position, and thereby preventing damage to the hinge 206.

Referring now to FIG. 3, the main closure body 202 of closure body 200 is further shown to include a peripheral closure cap ledge 218 and a plurality of threads 220. The peripheral closure cap ledge 218 provides a mating surface for the closure cap 204 while in the closed cap position. In some embodiments, the closure cap 204 is retained in the closed cap position via a closure cap retention feature 226 adjacent to the peripheral closure cap ledge 218. In some embodiments, closure cap retention feature 226 is a protrusion located on the periphery of the main closure body 202 that is configured to retain closure cap 204 in the closed cap position via a snap fit joint.

The plurality of threads 220 are configured to threadably couple the closure body 200 to a dispensing container (not shown). Although depicted as external (i.e., male) threads, in some embodiments, the plurality of threads 200 are internal (i.e., female) threads. The dispensing container may be any suitable container for a flowable product. In an exemplary embodiment, the dispensing container is a deformable container for a foodstuff configured to be stored in an inverted position (i.e., with the closure body 200 resting on a support surface and the dispensing container extending upwards from the closure body 200). For example, the foodstuff may be a condiment such as ketchup, mustard, or mayonnaise or another type of viscous food such as honey, jam, or jelly. In other embodiments, the dispensing container is a container for household, pharmaceutical, automotive or industrial products including, but not limited to, soaps, shampoos, lotions, detergents, cleaning fluids, and oils.

Main closure body 202 is further shown to include an annular wall 224 extending toward the interior of the dispensing container from a top deck surface 222 of the central raised portion 208. Annular wall 224 may extend far enough toward the interior of the dispensing container to substantially encapsulate the co-injected valve 300. For example, in some embodiments, annular wall 224 includes a protrusion configured to engage with a recess feature on the co-injected valve 300 such that the co-injected valve 300 may be detachably coupled to the closure body 200 via a snap fit joint. Further details of the snap fit assembly process are included below with reference to FIG. 8. In other embodiments, co-injected valve 300 may be permanently coupled to the closure body 200 through an ultrasonic assembly process. Ultrasonic assembly of plastic parts is accomplished by converting high frequency electrical energy into high frequency mechanical motion. The mechanical motion, along with applied force, creates frictional heat at the joint between the plastic components, such that the plastic in the area of the joint melts and forms a molecular bond between the parts. Use of an ultrasonic assembly process may necessitate certain changes to the structural design of the closure body 200 and/or the co-injected valve 300.

Co-Injected Valve

Figure 5:
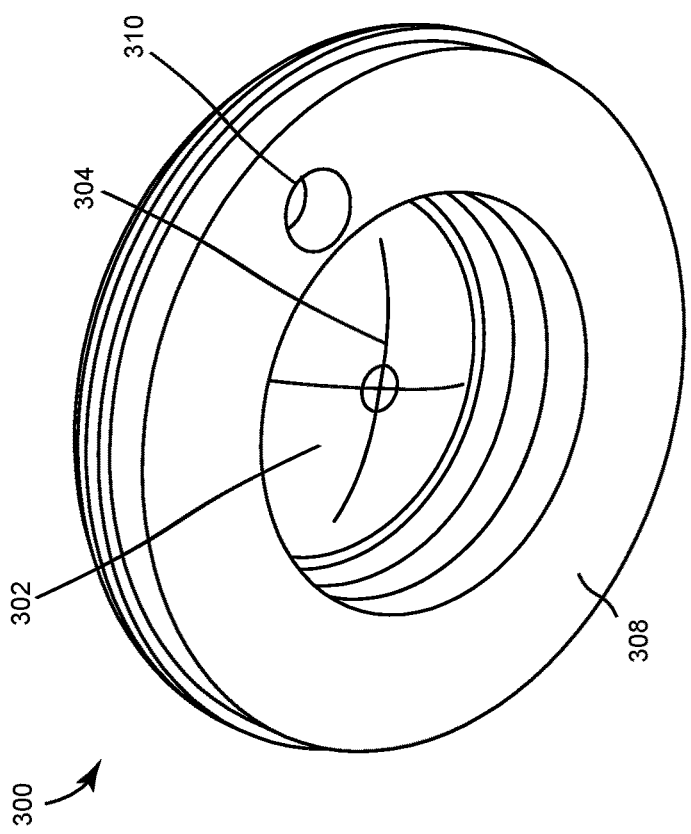
FIG. 5 is a bottom perspective view of the co-injected valve assembly of FIG. 4, according to an exemplary embodiment.
Figure 4:
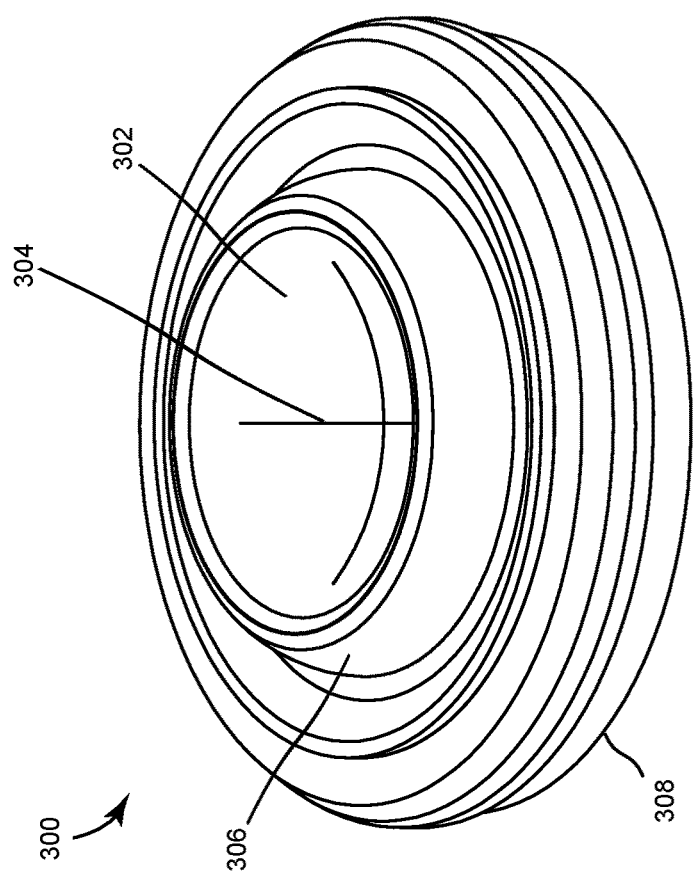
FIG. 4 is a top perspective view of a co-injected valve assembly used in the valve and closure assembly of FIG. 1, according to an exemplary embodiment.
Figure 7:
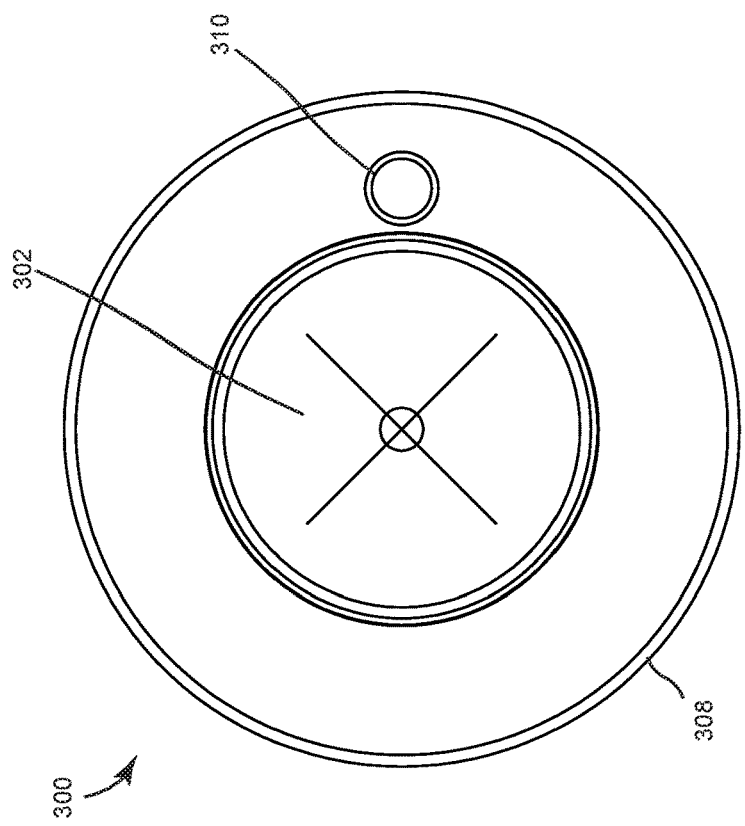
FIG. 7 is a bottom elevation view of the co-injected valve assembly of FIG. 4, according to an exemplary embodiment.
Figure 6:
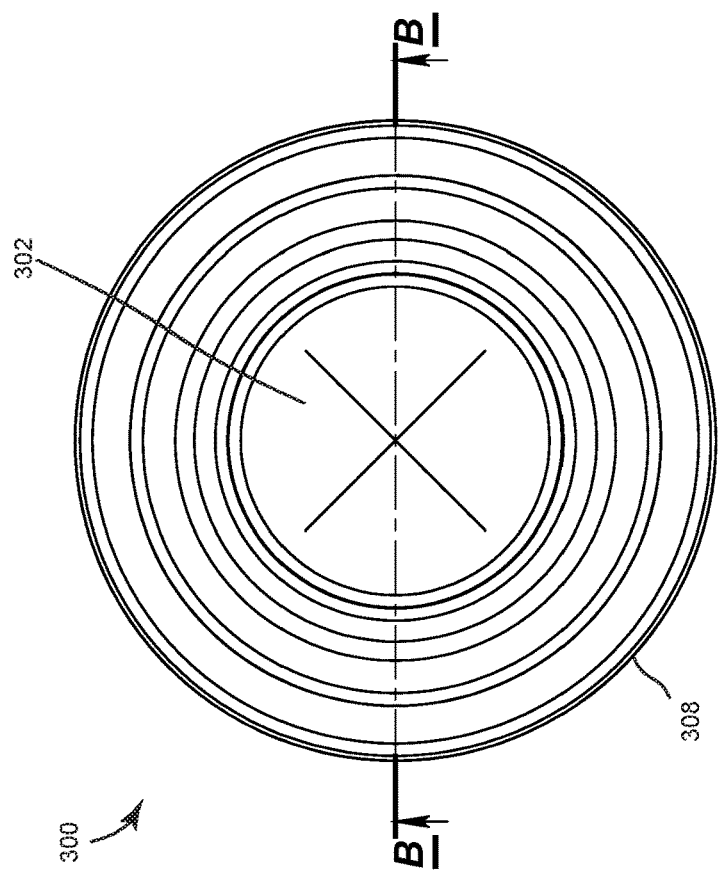
FIG. 6 is a top elevation view of the co-injected valve assembly of FIG. 4, according to an exemplary embodiment.
Figure 8:
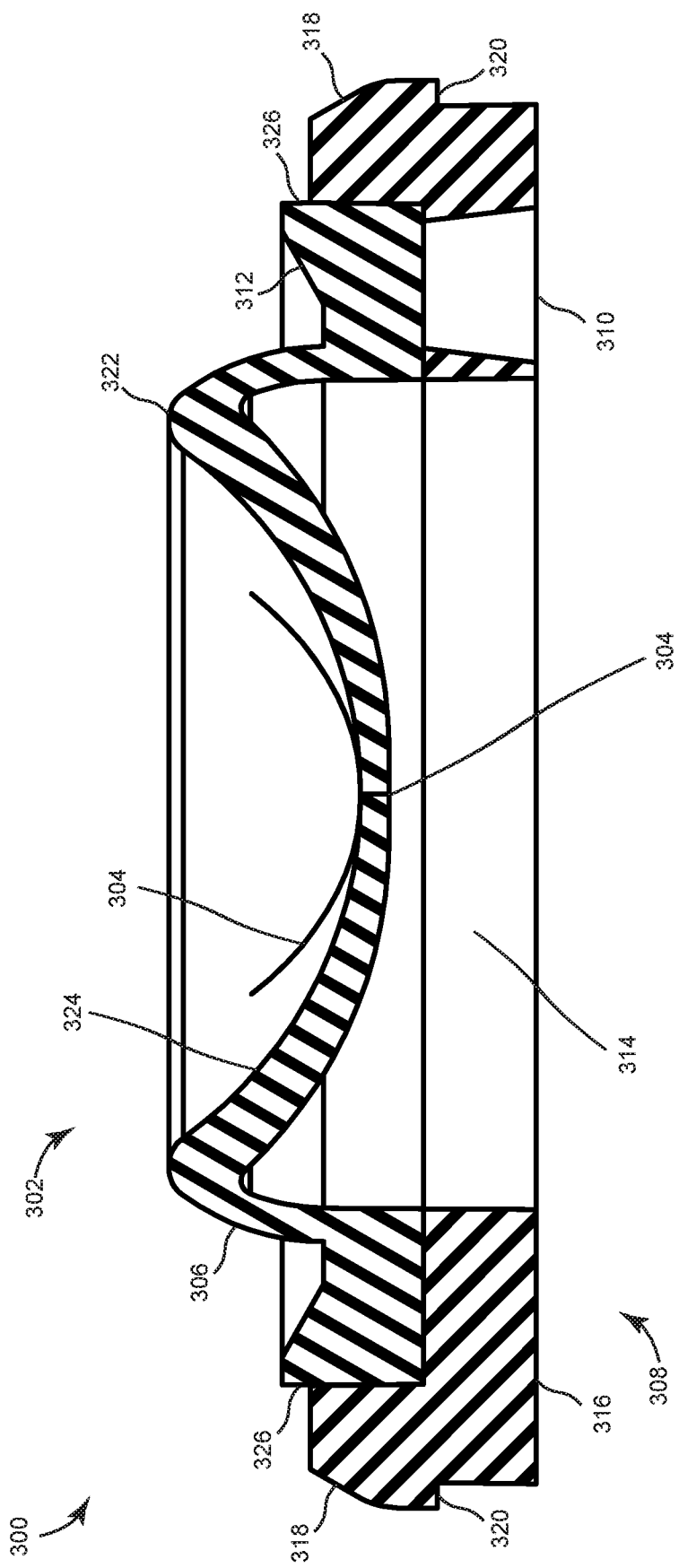
FIG. 8 is side cross-sectional view of the co-injected valve assembly taken along the line B-B in FIG. 6, according to an exemplary embodiment.

Referring now to FIGS. 4-8, the co-injected valve 300 is shown, according to an exemplary embodiment. FIGS. 4 and 5 depict perspective views of the co-injected valve 300, while FIGS. 6 and 7 respectively depict top and bottom views of the co-injected valve 300. FIG. 8 depicts a sectional view of the co-injected valve 300 taken along the line B-B of FIG. 6. In various embodiments, as described above, the co-injected valve 300 may be detachably coupled to the closure body 200 to form the valve assembly 100. Co-injected valve 300 may include two inseparably coupled components: a valve head 302 and a valve frame 308.

The valve head 302 and the valve frame 308 of the co-injected valve 300 may be fabricated from an injection molding process. In some embodiments, the injection molding process is a "two-shot" or "double-shot" injection molding process. A two-shot injection molding process utilizes an injection molding machine with two independent injection units or nozzles, each of which is configured to dispense a material with at least one different material characteristic than the other injection unit. By combining different materials with improvements in injection molding technology, complex functional parts can be produced economically and efficiently in large quantities. For example, a two-shot injection molding process may be utilized to fabricate a single part from materials of different compositions (e.g., different polymer types) or different colors.

In some cases, a two-shot injection molding process is utilized to fabricate a part consisting of both hard and soft plastic materials such that the hard plastic material provides structure to the soft plastic material. For example, valve frame 308 may be fabricated from polypropylene (PP). PP is a thermoplastic polymer with advantageous characteristics including good chemical resistance, toughness, and fatigue resistance. In some embodiments, valve head 302 may be fabricated from a thermoplastic elastomer (TPE). TPEs may combine the elastic properties of vulcanized rubber with the processing properties of thermoplastics. Advantages of TPEs include low material cost, good chemical resistance, and good tear resistance. TPEs are also recyclable. By contrast, silicone, which is often utilized in the valve heads of dispensing containers, is generally more expensive than TPEs, cannot be used with products containing mineral oils, cannot be molded via a two-shot injection molding process, and is generally not recyclable.

In various embodiments, the two-shot injection molding process of fabricating the co-injected valve 300 may proceed as follows: the PP for the valve frame 308 is injected via a first injection nozzle into a first cavity of a two-cavity mold. During the first injection process, the second cavity is closed off from the first cavity such that the PP from the first injection nozzle does not fill the second cavity. Once the first injection process is complete, the mold is manually or automatically rotated within the injection molding machine, and the TPE for the valve head 302 is injected via a second injection nozzle into the second cavity of the two-cavity mold. Once a sufficient cooling period has elapsed, the mold is opened and the finished co-injected valve 300 is ejected from the mold. Due to the properties of PP and TPE, the valve head 302 is permanently bonded to the valve frame 308 without the requirement of adhesives or mechanical fasteners. In various embodiments, as described above, ejection of the co-injected valve 300 from the mold may be followed by a laser or mechanical blade slitting or cutting process to form the one or more valve slits 304.

To assist in the injection molding process, valve frame 308 is shown to include an access window 310. Access window 310 is configured to permit the passage of a second injection molding nozzle for the purpose of depositing material for the valve head 302 (e.g., TPE) into the second cavity of a two-cavity mold. In some embodiments, access window 310 has a tapered shape. In other embodiments, access window 310 may be any size or shape required to permit passage of the second injection nozzle without sacrificing the structural integrity of the valve frame 308.

Referring specifically to FIG. 8, a cross-sectional view B-B of the co-injected valve 300 is shown, according to some embodiments. Valve head 302 is shown to include a valve head portion 324 coupled to a sleeve portion 306 via a hinge portion 322. The hinge portion 322 is configured to act as a flexion point that permits the valve head portion 324 to transition from a closed valve position to an open valve position. Further details of the co-injected valve in the open position are included below with reference to FIGS. 9-11. The thickness of the valve head portion 324 may be configured to decrease substantially continuously from the area adjacent to the hinge portion 322 to the center of the valve head portion 324 (i.e., the intersection point of the valve slits 304). In some embodiments, the valve head portion 324 includes an area of uniform thickness proximate the center of the valve head portion 324. The thickness distribution of the valve head portion 324 may be selected to control the pressures required to move the valve head 302 between its open and closed valve positions. For example, by situating the thinnest segment of the valve head portion 324 at the center of the valve head 302, air may be permitted to vent back through the valve slits 304, thus preventing drips and/or leakage of the contents of the dispensing container when the valve head 302 transitions from an open valve position to a closed valve position.

Sleeve portion 306 is configured to couple the hinge portion 322 to the peripheral sealing flange 312. As shown, in some embodiments, the peripheral sealing flange 312 has a partial dovetail shape in that the peripheral sealing flange 312 includes a inclined upper surface that serves to increase the thickness of the peripheral seal flange 312 as the radial distance from the center of the valve head 302 increases. In various embodiments and as depicted in FIG. 3, the inclined upper surface of the peripheral sealing flange 312 may be compressed by a surface extending from the deck 222 of the closure body 200 such that the contents of the dispensing container are not permitted to leak between the closure body 200 and the co-injected valve 300 when the co-injected valve 300 is in the open valve position.

Valve frame 308 is configured to surround a central dispensing aperture 314. The contents of the dispensing container may travel through the central dispensing aperture 314 before passing through the valve slits 304 and out of the dispensing container. As shown, valve frame 308 includes a radial ledge 316 configured to support the peripheral sealing flange 312. As described above, due to the properties of the materials utilized in the two-shot injection molding process, no adhesives or mechanical fasteners are required to permanently couple the valve head 302 to the valve frame 308. A radial wall 318 extends from the radial outermost edge of the radial ledge 316 such that the radial edge 326 of the peripheral sealing flange 312 is supported along nearly its entire length by the radial wall 318. In some embodiments, radial wall 318 includes a retention notch 320 having a size and shape such that it is configured to detachably engage with a protrusion located on the annular wall 224 of the closure body 200. For example, the retention notch 320 may enable the co-injected valve 300 to assemble to the closure body 200 via a snap fit assembly process. In other embodiments, the co-injected valve 300 is coupled to the closure body 200 via an ultrasonic assembly process.

Valve Assembly Dispensing

Referring now to FIGS. 9-11, several views of the valve assembly 100 in an open or dispensing position are depicted, according to an exemplary embodiment. As shown, valve assembly 100 may include a closure body 200, and as described above with reference to FIGS. 1-3, closure body 200 may include a main closure body 202 connected to a closure cap 204 via a hinge 206. The main closure body 202 may comprise a central raised portion 208, a central aperture 210, and a cap opening recess 214, while the closure cap 204 may comprise a stopper 212 and a cap opening recess 216.

Valve assembly 100 is further shown to include a co-injected valve 400. Co-injected valve 400 may be identical or substantially similar to the co-injected valve 300 described above with reference to FIGS. 1-8, although in contrast to co-injected valve 300, the co-injected valve 400 of FIGS. 9-11 is depicted in the open valve position. As described above, the co-injected valve 400 may transition from the closed valve position to the open valve position upon the application of sufficient force to the dispensing container, as the force increases the pressure on the contents within the dispensing container until the pressure of the contents on the valve head 402 is sufficient to operate the co-injected valve 400 from the closed valve position to the open valve position. In the absence of a force applied to the dispensing container, the co-injected valve 400 is configured to automatically transition from the open valve position back to the closed valve position. As described above, in some embodiments, this transition involves an intake of air back into the dispensing container to prevent drips or leaks from the co-injected valve 400. The intake of air may also aid the dispensing container in returning to its neutral or uncompressed shape in the absence of an applied force.

Similar to co-injected valve 300, the valve head 402 of co-injected valve 400 includes a valve head portion 424 with multiple valve slits 404. The multiple valve slits 404 are configured to permit the valve head portion 424 to flare outward and form an aperture through which the contents of the dispensing container are permitted to flow to flow freely when the co-injected valve 400 is in the open valve position. As shown, other components of the valve head 402, including the hinge portion 422, the sleeve portion 406, and the peripheral sealing flange 412 are stationary between the open valve position and the closed valve position.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

In the present disclosure, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure.

The terms "coupled," "connected," and the like as used herein mean the joining of two members directly or indirectly to one another. Such joining may be stationary (e.g., permanent) or moveable (e.g., removable or releasable).

Such joining may be achieved with the two members or the two members and any additional intermediate members being integrally formed as a single unitary body with one another or with the two members or the two members and any additional intermediate members being attached to one another.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A co-injection molded valve comprising:
   a valve head comprising:
      a valve head portion with one or more valve head slits, the valve head portion having a first thickness;
      a hinge portion coupled to the valve head portion, the hinge portion having a second thickness;
      a sleeve portion coupled to the hinge portion, the sleeve portion having a third thickness; and
      a peripheral sealing flange coupled to the sleeve portion; and
   a valve frame permanently coupled to the valve head and comprising:
      a radial ledge; and
      a radial wall, the radial wall supporting the peripheral sealing flange such that the hinge portion is located substantially above the radial wall;
   wherein the second thickness is substantially greater than the first thickness and substantially greater than the third thickness, such that the hinge portion, the sleeve portion, and the peripheral sealing flange are stationary as the valve head transitions between a closed valve position and an open valve position; and
   wherein the co-injected molded valve is fabricated via an injection molding process comprising at least two steps, a first step comprising fabricating the valve frame from a first injection material, and a second step comprising fabricating the valve head from a second injection material.

2. The co-injection molded valve of claim 1, wherein the first injection material is polypropylene.

3. The co-injection molded valve of claim 1, wherein the second injection material is a thermoplastic elastomer.

4. The co-injection molded valve of claim 1, wherein the one or more valve head slits is formed via a mechanical cutting process.

5. The co-injection molded valve of claim 1, wherein the one or more valve head slits is formed via a laser cutting process.

6. The co-injection molded valve of claim 1, wherein the radial wall comprises a retention notch configured to couple the co-injection molded valve to a dispensing container closure body via at least one of a snap fit assembly process and an ultrasonic assembly process.

7. The co-injection molded valve of claim 1, wherein the valve frame further comprises an access window configured to permit passage of an injection molding nozzle used to deposit the second injection material.

8. The co-injection molded valve of claim 6, wherein the dispensing container closure body comprises a closure cap, the closure cap comprising a stopper configured to support the valve head when the closure body is in a closed cap position.

* * * * *